US009787985B2

(12) United States Patent
Korman et al.

(10) Patent No.: US 9,787,985 B2
(45) Date of Patent: Oct. 10, 2017

(54) REDUCTION OF SPATIAL PREDICTORS IN VIDEO COMPRESSION

(75) Inventors: Mikhail Korman, Saint-Petersburg (RU); Sergey Fedorov, Saint-Petersburg (RU)

(73) Assignee: Synopsys, Inc., Mountain View, CA (US)

(*) Notice: Subject to any disclaimer, the term of this patent is extended or adjusted under 35 U.S.C. 154(b) by 1023 days.

(21) Appl. No.: 13/536,793

(22) Filed: Jun. 28, 2012

(65) Prior Publication Data

US 2013/0163671 A1    Jun. 27, 2013

(30) Foreign Application Priority Data

Dec. 23, 2011    (RU) ................ 2011152909

(51) Int. Cl.
| | |
|---|---|
| *H04N 19/11* | (2014.01) |
| *H04N 19/176* | (2014.01) |
| *H04N 19/593* | (2014.01) |
| *H04N 19/463* | (2014.01) |
| *H04N 19/157* | (2014.01) |
| *H04N 19/50* | (2014.01) |
| *H04N 19/159* | (2014.01) |
| *H04N 19/196* | (2014.01) |

(Continued)

(52) U.S. Cl.
CPC .......... *H04N 19/11* (2014.11); *H04N 19/176* (2014.11); *H04N 19/154* (2014.11); *H04N 19/157* (2014.11); *H04N 19/159* (2014.11); *H04N 19/196* (2014.11); *H04N 19/463* (2014.11); *H04N 19/50* (2014.11); *H04N 19/503* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 2002/0090028 A1* | 7/2002 | Comer et al. | 375/240.2 |
| 2003/0223496 A1* | 12/2003 | Sun et al. | 375/240.12 |
| 2004/0008771 A1* | 1/2004 | Karczewicz | 375/240.03 |

(Continued)

OTHER PUBLICATIONS

Kim, D. et al., "Intra Prediction Mode Coding by Using Decoder-Side Matching," MMSP '09, Rio de Janeiro, Brazil, IEEE, Oct. 5-7, 2009, 4 pages.

(Continued)

*Primary Examiner* — Joseph Ustaris
*Assistant Examiner* — William Adrovel
(74) *Attorney, Agent, or Firm* — Fenwick & West LLP

(57) ABSTRACT

A system and a method are disclosed for encoding and decoding a video frame using spatial prediction. The video frame is separated into a plurality of image blocks, and a plurality of spatial predictors is created for an image block using methods well-known in the art. The set of predictors is reduced to a set containing fewer spatial predictors before continuing the coding process for the block. The reduction of spatial predictors involves comparing a plurality of spatial predictors and grouping or processing a subset of the spatial predictors to a set of representative spatial predictors. Because the number of spatial predictors is reduced, fewer bits may be used in a bit stream to identify a chosen spatial predictor, thus improving the efficiency of the coding process.

22 Claims, 9 Drawing Sheets

(51) Int. Cl.
  *H04N 19/503* (2014.01)
  *H04N 19/154* (2014.01)

(56) References Cited

U.S. PATENT DOCUMENTS

2010/0278266 A1* 11/2010 Daian .................. H04N 19/176
                                                              375/240.15
2010/0309977 A1* 12/2010 Andersson et al. ..... 375/240.12
2011/0243230 A1* 10/2011 Liu ...................... H04N 19/176
                                                              375/240.14
2011/0292994 A1* 12/2011 Lim et al. ................. 375/240.02
2012/0230403 A1*  9/2012 Liu et al. .................. 375/240.12
2012/0327999 A1* 12/2012 Francois et al. ......... 375/240.02

OTHER PUBLICATIONS

Zhang, K. et al., "An Efficient Coding Method for Intra Prediction Mode Information," IEEE, 2009, pp. 2814-2817.

* cited by examiner

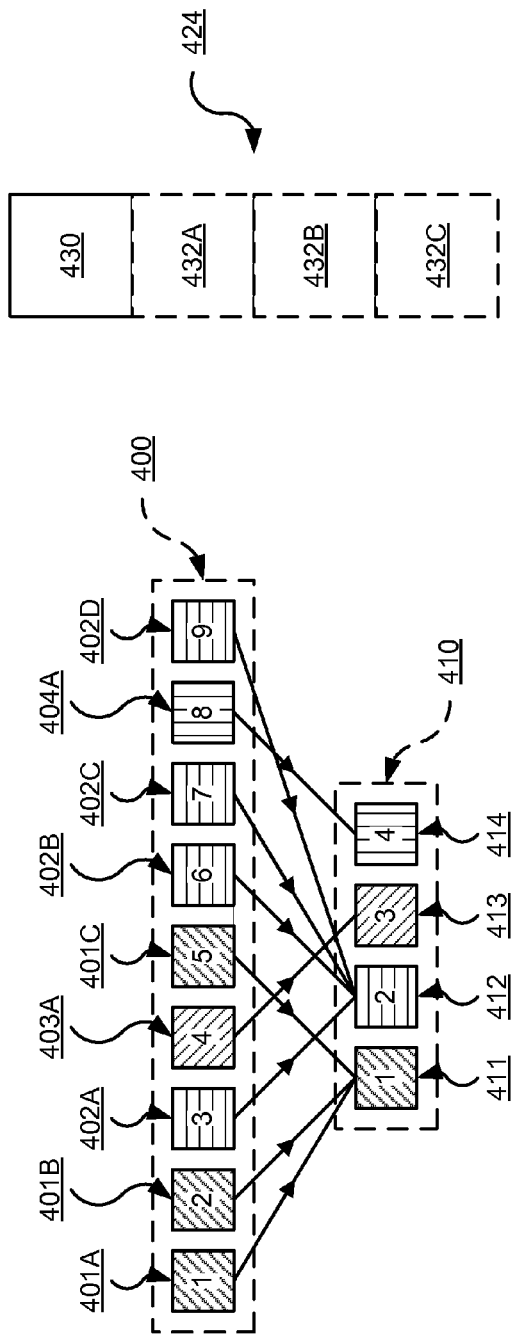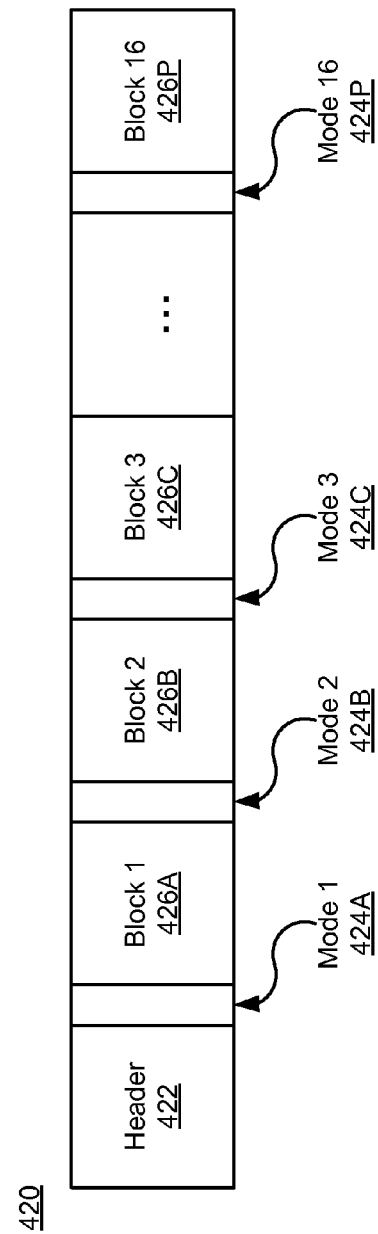

US 9,787,985 B2

REDUCTION OF SPATIAL PREDICTORS IN VIDEO COMPRESSION

BACKGROUND

1. Field of Art

The disclosure generally relates to the field of video compression, and more specifically to the selection and coding of spatial prediction mode information for the compression of video files.

2. Description of the Related Art

The popularity of high-resolution displays, faster computing equipment, and high-speed internet connections has given many people the capability to download, store, and view videos on their computing devices. Since video files are typically larger than most other forms of digital multimedia, techniques to reduce the file size of videos are of especially high interest to many entities, such as online content providers and internet service providers who wish to reduce their operating costs. Several techniques exist to compress video files so they can be transferred and stored more efficiently. Many compression methods take advantage of the fact that video files typically contain large amounts of repeated information. For example, a sequence of consecutive frames typically contains similar images, and individual frames may contain large areas of similar image information, such as shadows or blue skies.

Many modern video codecs operate by dividing a video frame into a series of small blocks and using several different techniques (called prediction modes) to predict the content of the block. Each prediction mode generates a predictor, which is a two-dimensional block of data that contains an estimate of the contents of the block. There are two broad categories of prediction modes. Temporal modes (inter prediction modes) use data from blocks in previously decoded frames to predict the contents of a block, while spatial modes (intra prediction modes) use information from blocks in the same frame. Once all predictors have been calculated, the predictor that yields the closest match to the raw data in the block is chosen, and an identifier for the predictor is stored in the bit stream along with a residual that represents the difference between the predictor and the raw data in the block.

As the number of predictors increases, the number of bits needed to identify the prediction mode used for each block also increases. When more bits are needed to identify each prediction mode, the size of the compressed video file might increase, thus reducing the effectiveness of the codec.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4A illustrates a mapping from a set of spatial predictors to a smaller set of representative spatial predictors, according to one embodiment.

FIG. 4B illustrates a bit stream for an encoded video, according to one embodiment.

FIG. 4C illustrates the mode data that is stored in the bit stream, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. The following description that alternative embodiments of the structures and methods illustrated herein may be employed without departing from the principles described herein.

Embodiments relate to spatial prediction for encoding or decoding of video frames where spatial predictors of a block in a video frame are reduced to fewer representative spatial predictors before continuing the encoding process. The reduction of the spatial predictors involves comparing a plurality of spatial predictors and grouping or processing a subset of the spatial predictors to a set of representative spatial predictors. Because the number of spatial predictors is reduced, fewer bits may be used in a bit stream to identify a chosen spatial predictor. In a decoding process, the same process of reducing the spatial predictors is preformed to identify the chosen spatial predictor and reconstruct the block.

A predictor, as used herein, refers to a prediction of the contents of a block in a video frame. During an encoding or decoding process, a video compression scheme may generate a plurality of predictors using a plurality of different prediction methods and use a variety of methods to select one of the predictors to use for encoding or decoding the block. Specifically, a spatial predictor is a prediction that is generated using content from the same video frame. For example, a spatial predictor may be a prediction of a block that is generated based on the pixels adjacent to the block.

Example Architecture for Encoding or Decoding of Video

Figure 1:
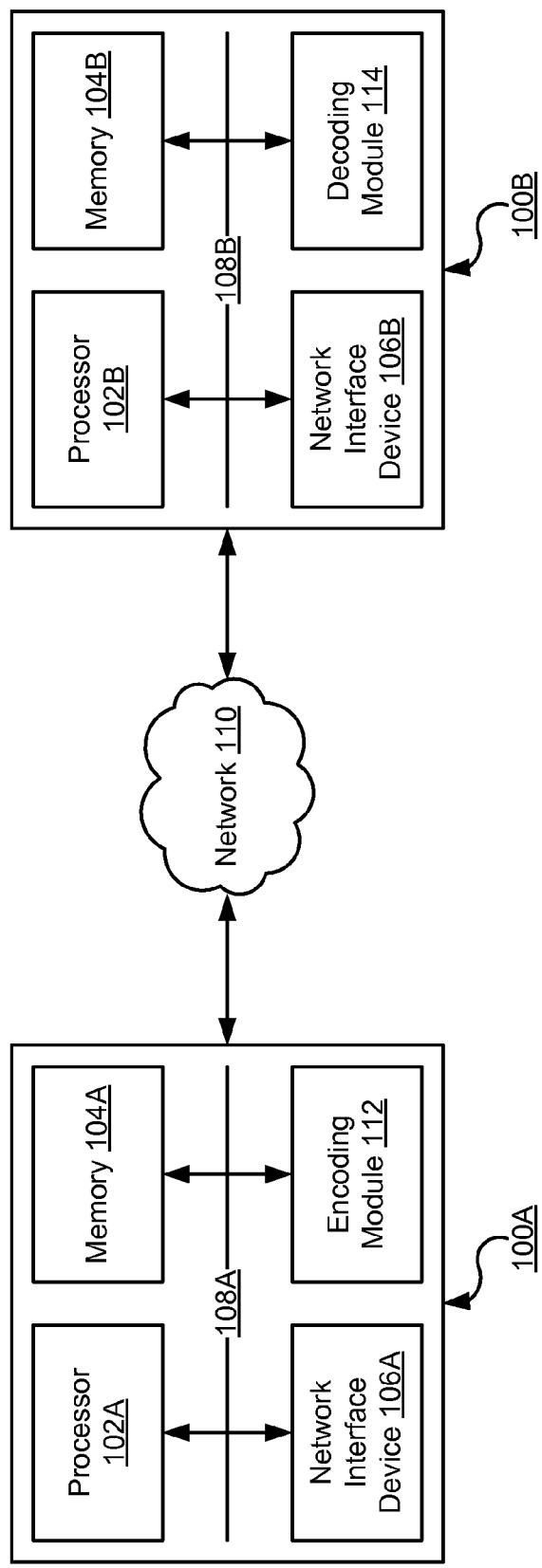
FIG. 1 is a block diagram illustrating a typical computing environment for video encoding and decoding processes.

FIG. 1 is a block diagram illustrating a typical environment for video encoding and decoding processes. The environment includes two computing devices 100A, 100B connected over a network 110 (e.g., the Internet). Each of the computing devices 100A, 100B contains, among other components, a processor 102A or 102B, memory 104A or 104B, and a network interface device 106A or 106B. Additionally, the computing device 100A contains an encoding module 112, and the computing device 100B contains a decoding module 114. The components in the two computing devices 100A, 100B are communicatively coupled through a bus 108A or 108B.

The processor 102A or 102B in each computing device 100A, 100B executes computer-readable instructions. To execute instructions, the processor 102A or 102B may access the memory 104A or 104B. Although only one processor 102A, 102B is illustrated in each computing device 100A or 100B, each computing device 100A or 100B may contain multiple processors or processor cores that operate in parallel or perform some dedicated functions. The memory 104 is any non-transitory computer-readable storage medium capable of storing both data and computer-readable instructions accessed by the processor 102. The memory 104 may include any combination of volatile storage (e.g., RAM) and non-volatile storage (e.g., hard disk drive, solid state drive, compact disc). The network interface devices 106A, 106B exchange data between the computing devices 100A, 100B, and other devices that are connected over the network 110.

The encoding module 112 is hardware, software, firmware or a combination thereof for receiving an unencoded raw video, either from the memory 104A or from another source (e.g., a video camera or the output of a video decoder), and for converting the raw video into an encoded format. The video in its encoded format typically has a smaller file size than the unencoded video, thus making it easier to store the encoded video in the memory 104A or transmit the encoded video over the network 110 to another computing device.

The decoding module 114 is hardware, software, firmware or a combination thereof for receiving an encoded video, either from the memory 104B or from an external source (e.g., the computing device 100A), and for converting the encoded video into a reconstructed format that can be reproduced on a display device.

Although pictured as separate entities, the encoding module 112 or the decoding module 114 may reside in whole or in part on the processor 102 or the memory 104. For example, the Intel Core i series of processors contain a hardware H.264 encoder, which is one possible implementation of the encoding module 112. The encoding module 112 or decoding module 114 may also reside on a separate hardware device, such as an application-specific integrated circuit (ASIC) or field-programmable gate array (FPGA), and the two modules 112, 114 may also be embodied as computer-readable machine code stored in the memory 104, either as a separate software package or as a component of a larger video processing application.

Embodiments as illustrated in FIG. 1 are merely illustrative. The encoding module 112 and the decoding module 114 may be embodied on stand-alone devices that do not communicate over any network. For example, the encoding module 112 and the decoding module may be embodied on a camera or a digital video recorder. Moreover, the components of the computing device 100A, 100B may be embodied in a single integrated circuit (IC) that may operate in conjunction with other electronic components.

Encoder Architecture Overview

Figure 2:
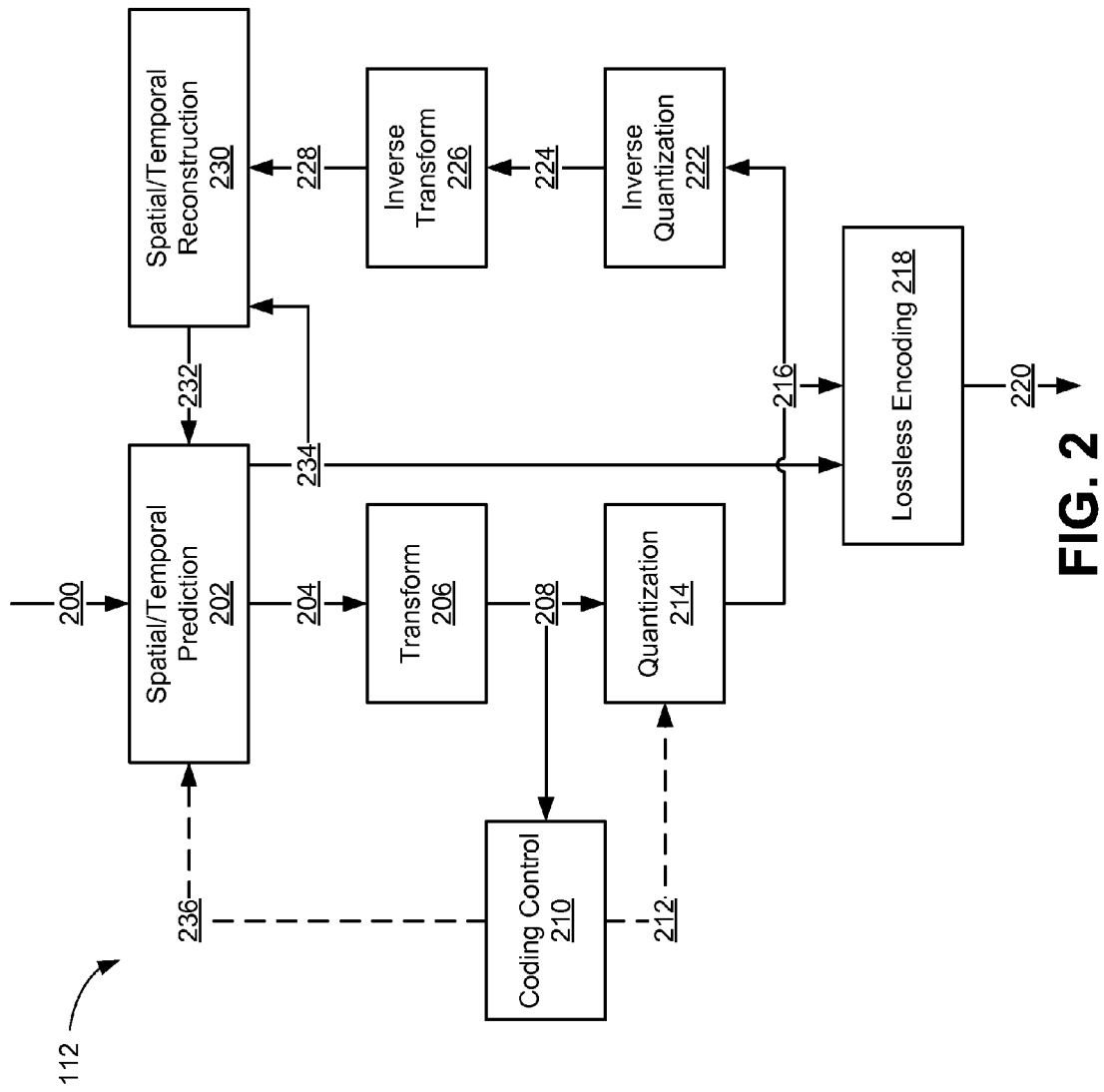
FIG. 2 is a block diagram illustrating an encoding module, according to one embodiment.

FIG. 2 is a block diagram illustrating the encoding module 112 in detail, according to one embodiment. The encoding module 112 may include, among other components, modules to perform spatial/temporal prediction 202, residual transformation 206, coding control 210, quantization 214, lossless encoding 218, inverse quantization 222, inverse transformation 226, and spatial/temporal reconstruction 230.

One or more of these components may be embodied in hardware, software, firmware or a combination thereof. The modules in the encoding module 112 work in combination to convert a stream of raw video frames 200 into an encoded and compressed bit stream 220.

The spatial/temporal prediction module 202 receives a raw frame 200, separates the raw frame into a series of macro-blocks (e.g., a predetermined number of adjacent blocks, such as a 4×4 grid of blocks), separates the macro-blocks into blocks, and makes predictions on blocks to be encoded. The prediction may be either spatial or temporal prediction. In temporal prediction, the spatial/temporal prediction module 202 uses previously decoded frames to make a prediction for the current frame. In spatial prediction, the spatial/temporal prediction module 202 uses information from the same frame to make predictions on blocks included in the same frame. Depending on the type of macroblock, the spatial/temporal prediction module 202 may use either spatial prediction or temporal prediction. Embodiments described herein relate primarily to performing spatial predictions on blocks in the same frame. As a result of spatial prediction, the module 202 generates a plurality of spatial predictors.

In spatial prediction, the spatial/temporal prediction module 202 uses a plurality of prediction methods to calculate a plurality of different predictors. In one embodiment, the spatial/temporal prediction module 202 divides the frame into 4×4 blocks and uses pixels adjacent to the top and left edges of the current block to calculate nine spatial prediction modes for the current block. Each prediction mode may use any combination of the adjacent edge pixels. For example, the first prediction mode may use the four pixels adjacent to the top edge of the current block to extrapolate the pixel values of each column, whereas the second prediction mode may use the four pixels adjacent to the left edge of the current block to extrapolate the pixel values of each row. The other prediction modes may perform diagonal extrapolation, use the mean of one or more adjacent edge pixels, or use some other method to predict the contents of the block.

After the plurality of predictors has been generated, the spatial/temporal prediction module 202 compares each predictor to the original block and chooses the most accurate prediction mode. The module 202 subtracts the chosen predictor from the original block to calculate a residual, which represents the difference between the chosen predictor and the original block. In one embodiment, the residual is a rectangular array wherein each element represents the residual for an individual pixel in the block. The spatial/temporal prediction module 202 sends the residual 204 to the transform module 206 and sends the chosen prediction mode 234 directly to the lossless encoding module 218 and the spatial/temporal reconstruction module 230.

In addition to the raw frames 200, the spatial/temporal prediction module 202 also receives reconstructed blocks from previous frames 232 from the spatial/temporal reconstruction module 230. The module 202 uses the reconstructed blocks 232 to perform temporal prediction. The spatial/temporal prediction module may also receive a similarity threshold 236 from the coding control module 210. The module 202 uses a similarity threshold in the spatial predictor reduction process to determine whether a pair of spatial predictors can be considered similar. The similarity threshold can be a predetermined constant that is saved in the spatial/temporal prediction module 202, or the threshold may be calculated in the coding control module and sent to the spatial/temporal prediction module 202.

The transform module 206 receives the residuals 204 from the spatial/temporal prediction module 202 and performs a mathematical transform on the residual 204 to decompose it into a weighted sum of components. In one embodiment, the discrete cosine transform (DCT) is used as the mathematical transform, and DCT coefficients in the form of an array (having the same dimensions as the array of residuals) are generated as a result. After the coefficients are calculated, the transform module sends the coefficients 208 to the coding control module 210 and the quantization module 214.

The coding control module 210 uses the transform coefficients 208 to calculate parameters that control the encoding process. The parameters may include, for example, a quantization coefficient 212 and a similarity threshold 236. A quantization coefficient 212 is a parameter used in lossy compression algorithms to compress a plurality of values into a single quantized value. As described above with reference to the spatial/temporal prediction module 202, the similarity threshold 236 is used in the spatial predictor reduction process to determine whether two predictors are similar. The coding control module 210 may use parameters such as the quantization coefficient 212 or a rate-distortion slope to determine the value of the similarity threshold 236. The quantization coefficient 212 is sent to the quantization module 214, and the similarity threshold 236 is sent to the spatial/temporal prediction module 202 to be used in the spatial predictor reduction process, as described below in detail with reference to FIGS. 3 and 4A. In other embodiments, the quantization coefficient 212 or the similarity threshold 236 may remain constant and are not modified by the coding control module 210.

The quantization module 214 uses a quantization coefficient 212 to quantize the transform coefficients 208, using methods well known in the art. After calculating the quantized coefficients 216, the quantization module 214 sends the quantized transform coefficients 216 to the lossless encoding module 218 and the inverse quantization module 222.

The lossless encoding module 218 receives quantized transform coefficients 216 and prediction mode information 234 and losslessly compresses both streams of data into a single bit stream 220. The single bit stream 220 for macro-blocks encoded using spatial prediction may be formatted in a manner, as described below in detail with reference to FIG. 4B. In one embodiment, the lossless encoding module compresses the data 216, 234 by performing entropy encoding, although any lossless data compression scheme may be used. One of the advantages of embodiments described herein is that the size of the bit stream 220 is reduced through reduction in the number of predictors, as described below in detail with reference to FIGS. 3 and 4A.

The inverse quantization 222, inverse transform 226, and spatial/temporal reconstruction modules 230 work in combination to reconstruct blocks from previous frames 232 using the quantized transform coefficients 216 and the prediction mode information 234. Processes associated with the operation of inverse quantization 222 and inverse transform modules 226 are well known in the art, and hence, description on the operation of these modules is omitted herein for the sake of brevity. In temporal prediction, the spatial/temporal reconstruction module 230 also performs operations that are well-known in the art. However, the component of the spatial/temporal reconstruction module 230 that performs spatial reconstruction is modified to use the same spatial predictor reduction process that was used to perform the spatial prediction in the spatial/temporal prediction module 202. This component and an overall process for decoding a macro-block that has been encoded with the spatial predictor reduction process are described with reference to FIGS. 6 and 8, respectively.

Figure 3:
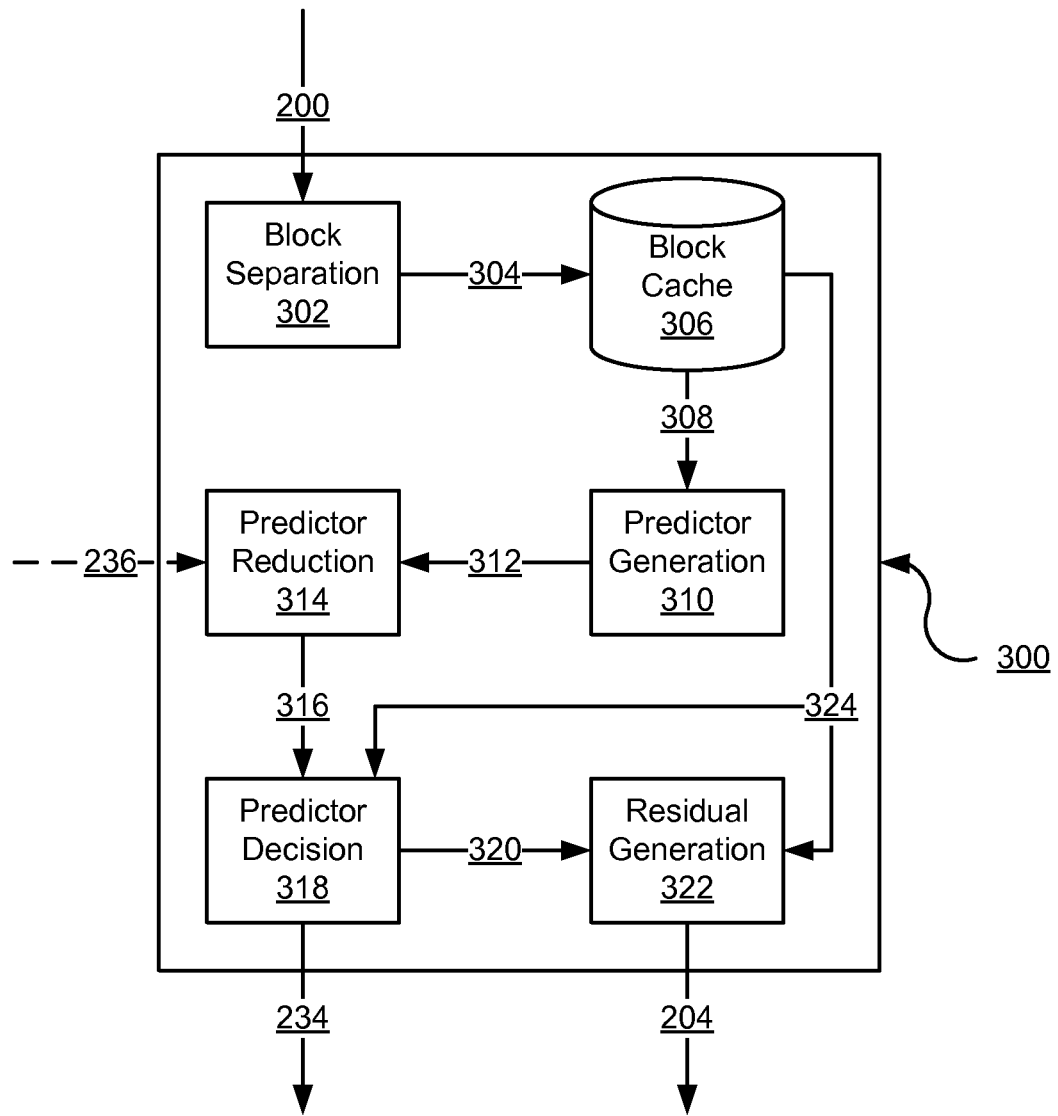
FIG. 3 is a block diagram illustrating a system for performing spatial prediction of blocks in a video frame, according to one embodiment.

FIG. 3 is a block diagram illustrating a module 300 within the spatial/temporal prediction module 202 for performing spatial prediction. The spatial prediction module 300 may contain, among other components, a block separation module 302, a block cache 306, a predictor generator 310, a predictor reduction module 314, a predictor decision module 318, and a residual generation module 322. The spatial prediction module 300 receives a raw video stream 200 and predictor similarity thresholds 236, and generates output residuals 204 and the mode information 234 for each block.

The block separation module 302 receives a raw frame 200 and separates the raw frame 200 into a series of small blocks. For example, a 1920×1080 image frame may be separated into an array of 4×4 blocks containing a total of 16 pixels. The block separation module may also group the blocks into macro-blocks. For example, the 4×4 blocks may be grouped into 16×16 macro-blocks. In alternative embodiments, different sizes may be used for the blocks and macro-blocks. After separating the frame into blocks and, optionally, macro-blocks, the block separation module sends the blocks 304 to the block cache 306.

The block cache 306 receives the blocks 304 for an entire video frame from the block separation module 302 and sends the blocks 324 one at a time to the predictor decision module 318 and the residual generation module 322. The block cache 306 also sends pixels 308 from selected blocks to the predictor generation module 310 for calculating spatial predictors for a block to be predicted. In one embodiment, the block cache sends the pixels adjacent to the top and left edge of the block to be predicted to the predictor generation module. The pixels adjacent to the top edge of the block to be predicted are located along the bottom edge of the block immediately above the block to be predicted, and the pixels adjacent to the left edge of the block to be predicted are located along the right edge of the block immediately to the left of the block to be predicted.

The predictor generation module 310 receives pixels 308 from other blocks in the frame and uses the pixels 308 to generate a plurality of spatial predictors for a block. In one embodiment, the predictor generation module 310 uses the pixels adjacent to the top and left edge of the block to calculate nine spatial predictors. Alternative embodiments may use more or fewer spatial prediction modes, and alternative spatial prediction modes may use different pixels to generate their respective predictors. The predictor generation module 310 sends the spatial predictors 312 to the predictor reduction module 314 after the spatial predictors are calculated.

The predictor reduction module 314 receives the full set of spatial predictors 312 from the predictor generation module 310 and groups the predictors into one or more sets of similar predictors. The predictor reduction module 314 generates the groups of similar predictors by calculating a difference metric (e.g., the Sum of Absolute Differences metric) between each pair of predictors. The difference metric quantifies the difference in content between two predictors, and the two predictors are considered similar if the difference metric falls below a similarity threshold. The similarity threshold can be calculated in the coding control module 210 and sent 236 to the predictor reduction module 314, or the similarity threshold can be a predetermined constant value that is saved in the predictor reduction module 314. For each set of similar predictors, the predictor reduction module 314 generates a representative predictor to represent the spatial predictors in the set. The process of grouping predictors into sets and generating a representative predictor is described in detail in FIG. 4A and FIG. 9. After determining or calculating the set of representative predictors, the predictor reduction module sends the representative predictors 316 to the predictor decision module 318.

The predictor decision module 318 receives a block 324 from the block cache 306 and also receives the set of representative predictors 216 for the block from the predictor reduction module. The module 318 compares each representative predictor to the block and selects the predictor that is closest in content to the original block based on a difference metric. The selected predictor 320 is sent to the residual generation module 322. The prediction mode information 234 for the selected predictor is sent to the lossless encoding module 218.

The residual generation module 322 receives the selected predictor 320 from the residual generation module and also receives the corresponding block 324 from the block cache. The residual generation module 322 subtracts the selected predictor 320 from the block 324 to generate a residual that represents the difference between the selected predictor and the block. The residual 204 is then sent to the transform module 206.

Predictor Mapping and Bit Stream Composition

FIG. 4A illustrates one possible mapping from a full set of original spatial predictors 400 to a smaller set of representative spatial predictors 410, according to one embodiment. To generate the mapping, the predictor reduction module 314 calculates a difference metric between each pair of original predictors 400. In one embodiment, the difference metric is the Sum of Absolute Differences (SAD), which sums the absolute value of the difference between each pair of pixel at matching positions in the two predictors. If the difference metric falls below a similarity threshold, then the two predictors are considered to be similar. As described above, the similarity threshold may be calculated in the coding control module 210, or it may be a predetermined constant that is saved in the predictor reduction module 314.

After the similarity calculations are completed, the predictor reduction module 314 organizes the original predictors 400 into groups of similar predictors. For example, the similarity values between predictors 1 (401A) and 2 (401B) and between predictors 2 (401B) and 5 (401C) in the original set of predictors 400 fall below the similarity threshold, so predictors 1, 2, and 5 are grouped together and mapped to a representative predictor 411. If a predictor is not similar to any other predictor according to the similarity threshold, then the predictor is placed in its own group. In the example shown in FIG. 4A, predictor 4 (403A) and predictor 8 (404A) in the original set of predictors 400 are not similar to any other predictor, so these two predictors 403A, 404A are each placed in their own group.

For each group of similar predictors, the predictor reduction module 314 generates a representative predictor to represent the predictors in the group. In one embodiment, the representative predictor is identical to the lowest indexed predictor in the group of predictors. For example, for the group 401 consisting of predictors 1, 2, and 5, the representative predictor 411 would be a copy of predictor 1. Alternatively, the representative predictor may be generated by taking a weighted mean of the predictors in the group. The weighted mean may also be an arithmetic mean if the same weight is assigned to each predictor in the group, or the weighted mean may exclude one or more predictors in the group by assigning a weight of zero to the predictor. Taking a weighted mean may result in a more accurate representative predictor but also requires more computing resources.

After a representative predictor has been generated for each group of similar predictors, the predictor reduction module 314 enumerates each of the representative predictors 410. In one embodiment, the enumeration of the representative predictors is based on the lowest-indexed predictor in the group associated with each representative predictor. For example, representative predictor 1 (411) is associated with a group 401 of original predictors that consists of predictor 1 (401A), predictor 2 (401B), and predictor 5 (401C). Since the group contains original predictor 1 (401A), it is not possible for a different group of original predictors to contain an original predictor with a lower index. Thus, this is the first group of similar predictors, and the representative predictor 411 associated with this group is enumerated 1. Similarly, representative predictor 2 (412) is associated with a group 402 consisting of original predictors 3 (402A), 6 (402B), 7 (402C), and 9 (402D). The lowest index in the group 402 of original predictors is 3. Since every original predictor with an index of less than 3 belongs to the first group (i.e., original predictors 1 (401A) and 2 (401B) both belong to the first group), the group 402 is the second group of predictors, and the representative predictor 412 associated with the second group is thus enumerated 2. Likewise, the group 403 (consisting of original predictor 4 (403A)) is the third group of predictors because every original predictor with an index of less than 4 belongs to either the first group or the second group, and the group 404 (consisting of original predictor 8 (404A)) is the fourth group of predictors because every original predictor with an index of less than 8 belongs to either the first group, the second group, or the third group. Thus, the representative predictor 413 associated with the third group is enumerated 3 and the representative predictor 414 associated with the fourth group is enumerated 4. In other embodiments, the enumeration of the representative may be determined in a different manner. For example, the representative predictors may be enumerated based on the highest-index predictor in the associated group, or a content-based metric (e.g., the average luminance of the pixels in the predictor) may be used to enumerate the representative predictors.

By generating and enumerating the representative predictors in a repeatable manner, the mapping from original predictors 400 to representative predictors 410 can be reconstructed during the decoding process as long as the set of original predictors 400 is generated in the same order. This allows the decoding process to generate the same set of representative predictors 410 in the same order. It is important for the decoder to be able to accurately reproduce and enumerate the set of representative predictors 410 because the prediction mode information 424 shown in FIG. 4B and FIG. 4C refers to the representative predictors using the same enumeration scheme.

FIG. 4B illustrates the contents of one macro-block in the bit stream 420 for a video that has been encoded with the spatial predictor reduction process, according to one embodiment. The bit stream contains a header block 422, prediction mode information 424 for each block, and block data containing quantized transform coefficients for the sixteen blocks 426 in the macro-block. Although the macro-block shown in FIG. 4B contains sixteen blocks, macro-blocks in alternative embodiments may contain a different number of blocks. In addition, the bit stream 420 may also contain other information that is not shown. For example, each frame may begin with a frame header indicating the values of the quantization coefficient and whether spatial or temporal prediction was used for the frame, although any of this information may also be stored in the header 422 on the macro-block level.

The header block 422 may contain information describing the type of encoding that was used for the macro-block. For example, the header 422 may include, among other information, a coding block pattern indicating which of the sixteen blocks 406 were coded and which blocks were not coded. The header block 422 may also include the quantization coefficient and whether spatial or temporal prediction was used for the macro-block. The prediction mode information 424 precedes each block 426 and indicates which representative predictor was chosen when the block was encoded. The bit stream alternates between prediction mode information 424 and block data 426 because the prediction mode for a block may be defined relative to the prediction mode of the previous block. This method of representing prediction modes in the bit stream is described in detail in the description of FIG. 4C.

FIG. 4C is a detailed view of the mode information 424 for each encoded block 426 in the bit stream 420, according to an embodiment in which the predictor generation module 310 to calculates nine predictors. The size of the mode information 424 may vary between zero bits and four bits depending on the number of representative predictors and whether the predictor chosen for the current block was identical to the predictor chosen for the previous block.

Zero bits are used to represent the mode information if the predictor reduction module 314 generated one representative predictor (i.e., all nine predictors were similar to each other). In the case where there is one representative predictor, no information is needed to indicate which predictor was chosen for the current block because only one choice is possible.

If the predictor reduction module 314 generated more than one representative predictor for the current block, then the first bit 430 is used to indicate whether the predictor that was selected for the current block was identical to the predictor that was selected for the previous block. If the two predictors are identical (i.e., the two predictors were assigned the same index during the enumeration process), then the additional bits 432 are omitted because the first bit 430 contains enough information to determine which predictor was chosen for the current block.

If the two predictors are not identical (i.e., the predictor chosen for the current block and the predictor chosen for the previous block were assigned a different indices during the enumeration process), then the first bit 430 is used to indicate that a different predictor was chosen, and up to three additional bits 432 are used to indicate which of the remaining representative predictors was chosen for the block. The number of additional bits used depends on the number of representative predictors that were generated in the predictor reduction module 314. For example, suppose the predictor reduction module 314 reduced the original set of nine predictors to a set of five representative predictors. Since the first bit 430 indicates that the representative predictor chosen for the current block is not the representative predictor that was chosen for the previous block, the representative predictor that was chosen for the previous block can be eliminated. This leaves four possible representative predictors, which means two bits 432A, 432B are needed to indicate which representative predictor was chosen, and the third bit 432C can be omitted to reduce the size of the bit stream 424. In general, one additional bit is needed if there were two or three representative predictors, two additional bits are needed if there were four or five representative predictors, and three additional bits are needed if there were between six and nine representative predictors. In alternative embodiments where the predictor generation module 310 generates more than nine predictors, more than three additional bits may be needed to indicate which representative predictor was chosen.

The method of creating representative predictors 410 and storing mode information 424 described with reference to FIGS. 4A and 4C may lead to a significant reduction in the number of bits that make up the bit stream 424. In video frames that contain large areas of similar information, such as blue skies or dark shadows, it is likely that the set of representative predictors 410 for the blocks associated with those areas will only contain one representative predictor, which means it is also likely that zero bits are used to represent the mode information. Using a set of representative predictors 410 that may contain fewer predictors than the original set 400 also increases the probability that the predictors selected for two consecutive blocks will be identical, in which case only one bit is needed to represent the mode information. In general, fewer bits are used to represent the mode information when the spatial predictor reduction process is used, which leads to a bit stream that contains fewer bits but can still be reproduced with little loss in picture quality relative to conventional methods of video compression.

Decoder Architecture Overview

Figure 5:
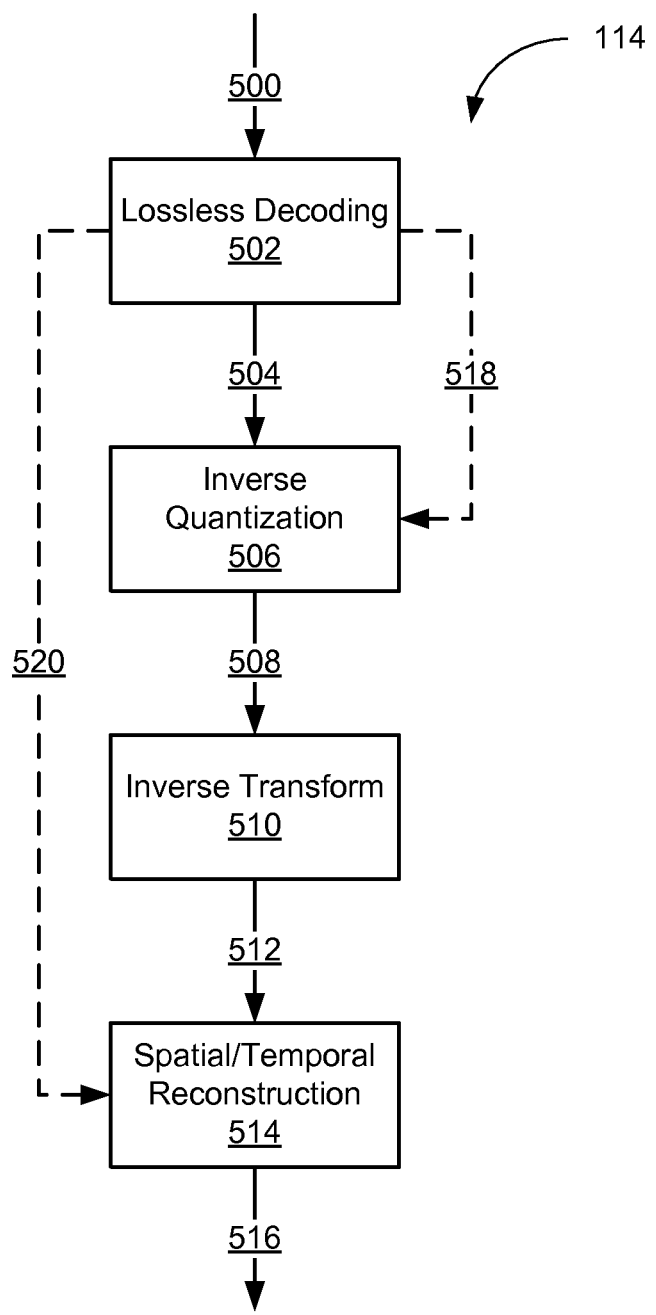
FIG. 5 is a block diagram illustrating a decoding module, according to one embodiment.

FIG. 5 is a block diagram illustrating the video decoding module 114 in detail, according to one embodiment. The video decoding module 114 may contain, among other components, modules to perform lossless decoding 502, inverse quantization 506, inverse transformation 510, and spatial/temporal reconstruction 514. Together, the components 502, 506, 510, 514 of the video decoding module 114 convert an encoded bit stream 500 containing residuals and mode information into a reconstructed video stream 516 that can be displayed to the user.

The lossless decoding module 502 receives the encoded bit stream 500 and reverses the data compression that was performed in the lossless encoding module 218 of the encoding module 112. After decoding the bit stream 500, the lossless decoding module 502 sends the decoded bit stream 504 to the inverse quantization module 506. The decoded bit stream 504 contains the elements shown in FIG. 4B, including, among other things, a header 422 for each macro-block, mode information 424 for each block 426, and block data 426 that contains the quantized transform coefficients for each block. If additional information was stored in the encoded bit stream 500 (e.g., a quantization coefficient), the lossless decoding module 502 sends the information to the appropriate modules within decoding module 114. In particular, the lossless decoding module 502 sends the quantization coefficient 518 to the inverse quantization module 506 and sends the similarity threshold 520 to the spatial/temporal reconstruction module 514.

The inverse quantization module 506 uses a quantization coefficient to convert the quantized transform coefficients in the block data 426 of the decoded bit stream 504 into reconstructed transform coefficients. In one embodiment, the quantization coefficient is stored in the encoded bit stream 500 and the inverse quantization module 506 receives the quantization coefficient 518 separately from the decoded bit stream 504. It is also possible for the quantization coefficient to be a predetermined value or array of values that is defined as part of a video codec and saved in the inverse quantization module 506. Since the quantization step performed in the encoding module 112 was a many-toone mapping, the inverse quantization module 506 may not be able to reconstruct the exact values of the transform coefficients. After the inverse quantization module 506 calculates the reconstructed transform coefficients, the reconstructed transform coefficients are stored in the block data 426 of the bit stream in place of the quantized transform coefficients, and the modified bit stream 508 is sent to the inverse transform module 510.

The inverse transform module 510 receives the modified bit stream 508 from the inverse quantization module 506 and performs an inverse mathematical transform on the reconstructed transform coefficients in the bit stream to calculate a reconstructed residual. For example, if the transform module 206 used the discrete cosine transform (DCT) to decompose the residual into transform coefficients, then the inverse transform module 510 would use the inverse discrete cosine transform to reconstruct the residual from the reconstructed transform coefficients. The reconstructed residuals are saved in the block data 426 of the bit stream in place of the reconstructed transform coefficients and the processed bit stream 512 is sent to the spatial/temporal reconstruction module 514.

The spatial/temporal reconstruction module 514 receives the processed bit stream 512 containing, among other things, header information for macro-blocks, mode information for each block, and reconstructed residuals for each block. The processed bit stream may also contain information indicating whether spatial or temporal prediction was used for each frame or macro-block. If the bit stream indicates that temporal prediction was used for a macro-block, then a temporal prediction module is used to reconstruct the macro-block. If spatial prediction was used, then a spatial reconstruction module replicates the spatial predictor reduction process to recreate the set of representative predictors and reconstructs the macro-block using the mode information, the representative predictors, and the residuals. After the macro-blocks for a frame are reconstructed, the spatial-temporal reconstruction module maps the macro-blocks to their positions within the frame and outputs the entire frame 516 in a format that can be displayed to the user.

Figure 6:
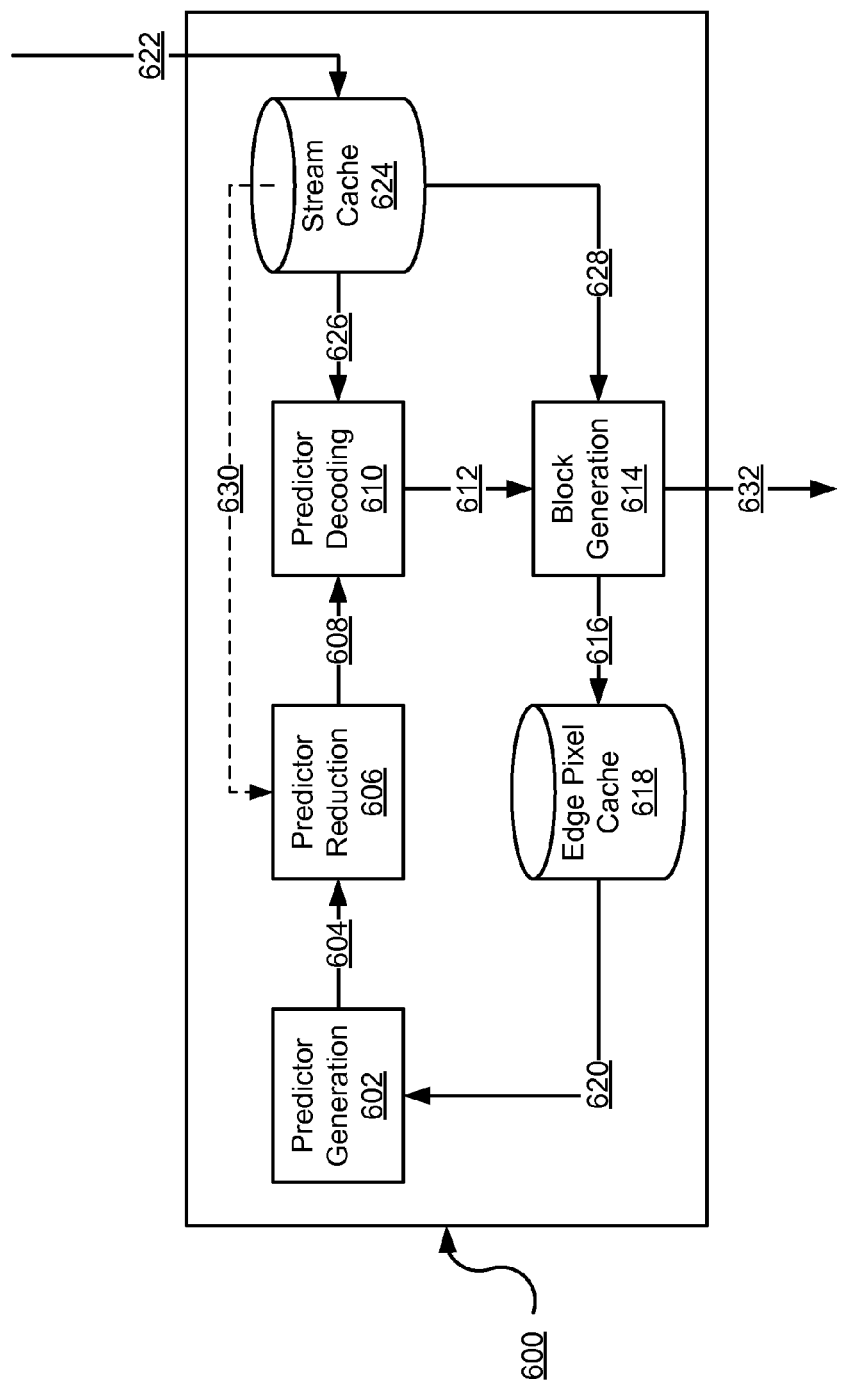
FIG. 6 is a block diagram illustrating a system for performing spatial reconstruction of blocks in an encoded video frame, according to one embodiment.

FIG. 6 is a block diagram illustrating a module 600 within the spatial/temporal reconstruction module 514 that performs spatial reconstruction for a macro-block 622 that was created using the spatial predictor reduction process. The spatial reconstruction module 600 contains, among other components, a predictor generation module 602, a predictor reduction module 606, a predictor decoding module 610, a block generation module 614, an edge pixel cache 618, and a stream cache 624. The spatial reconstruction module 600 receives a macro-block 622 containing reconstructed residuals and generates a reconstructed macro-block 632.

After the spatial/temporal reconstruction module 514 determines that a macro-block in the processed bit stream 512 was created with the spatial prediction reduction process (as described above in detail with reference to FIGS. 3 and 4A), the spatial/temporal reconstruction module 514 sends the macro-block 622 (including the header 422 and mode information 424, as shown in FIG. 4B) to the stream cache 624. The stream cache 624 sends different portions of the macro-block to different modules within the spatial reconstruction module 600. The prediction mode data 626 is sent to the predictor decoding module 610 and the block data 628 containing the reconstructed residual is sent to the block generation module 614. If a similarity threshold was saved in the bit stream, either on the frame level or on a lower level (e.g., associated with a specific color component, slice, or macro-block), then the similarity threshold 630 is sent to the predictor reduction module 606.

The spatial reconstruction process starts at the predictor generation module 602, which receives the edge pixels 620 that are needed to generate the full set of original predictors for a block. The original predictors 604 are sent to the predictor reduction module 606, which performs the same spatial predictor reduction process as the predictor reduction module 314 in the encoding module to generate a set of representative predictors, as described above with reference to FIG. 3. If the similarity threshold was saved in the bit stream, then the predictor reduction module 606 receives the similarity threshold 630 from the stream cache 624. The similarity threshold may also be stored in the predictor reduction module 606 as a predefined value.

After the predictor reduction module 606 generates a set of representative predictors, the predictor reduction module 606 sends the representative predictors 608 to the predictor decoding module 610. The predictor decoding module 610 receives the representative predictors 608 and the mode information 626. As described in FIG. 4C, the mode information 626 may contain between zero and four bits in an embodiment where a total of nine original predictors are used. Since the mode information 626 may be defined relative to the prediction mode that was chosen for the previous block, the predictor decoding module 610 contains a mode cache that is used to store the prediction mode for the previous block. The predictor decoding module 610 uses the mode information 626 and the mode cache to determine which representative predictor was chosen during the encoding process, and the chosen representative predictor 612 is sent to the block generation module 614.

The block generation module 614 receives the chosen predictor 612 and the reconstructed residual 628, and generates a reconstructed block 632 by adding the predictor 612 and the residual 628. The block generation module 614 outputs the reconstructed block 632, and a different component in the spatial/temporal reconstruction module 514 assembles the blocks in each frame and maps each block to its position within the frame. The block generation module 614 also sends one or more of the pixels 616 in the reconstructed block to the edge pixel cache 618, where the pixels are stored and used to generate predictors for subsequent blocks. In one embodiment, the block generation module 614 sends the pixels 616 along the right edge and the bottom edge of the reconstructed block to the edge pixel cache, but in alternative embodiments, any of the pixels 616 in the reconstructed block may be sent to the edge pixel cache 618.

The edge pixel cache 618 contains the pixels that are used to calculate prediction modes for subsequent blocks. The cache 618 receives one or more pixels 616 from each decoded block after the decoded block is generated in the block generation module 614, and the pixels are saved in the edge pixel cache 618 until the pixels 620 are sent to the predictor generation module 602 to be used to calculate prediction modes. In one embodiment, the predictor generation module 602 uses the pixels adjacent to the top and left edges of the block to be predicted, so the edge pixel cache 618 receives and stores pixels along the right and bottom edges of each reconstructed block. After a set of pixels has been used to generate predictors in the predictor generation module 602, the edge pixel cache may delete the pixels to reduce memory use.

Process of Determining Representative Spatial Predictors

Figure 7:
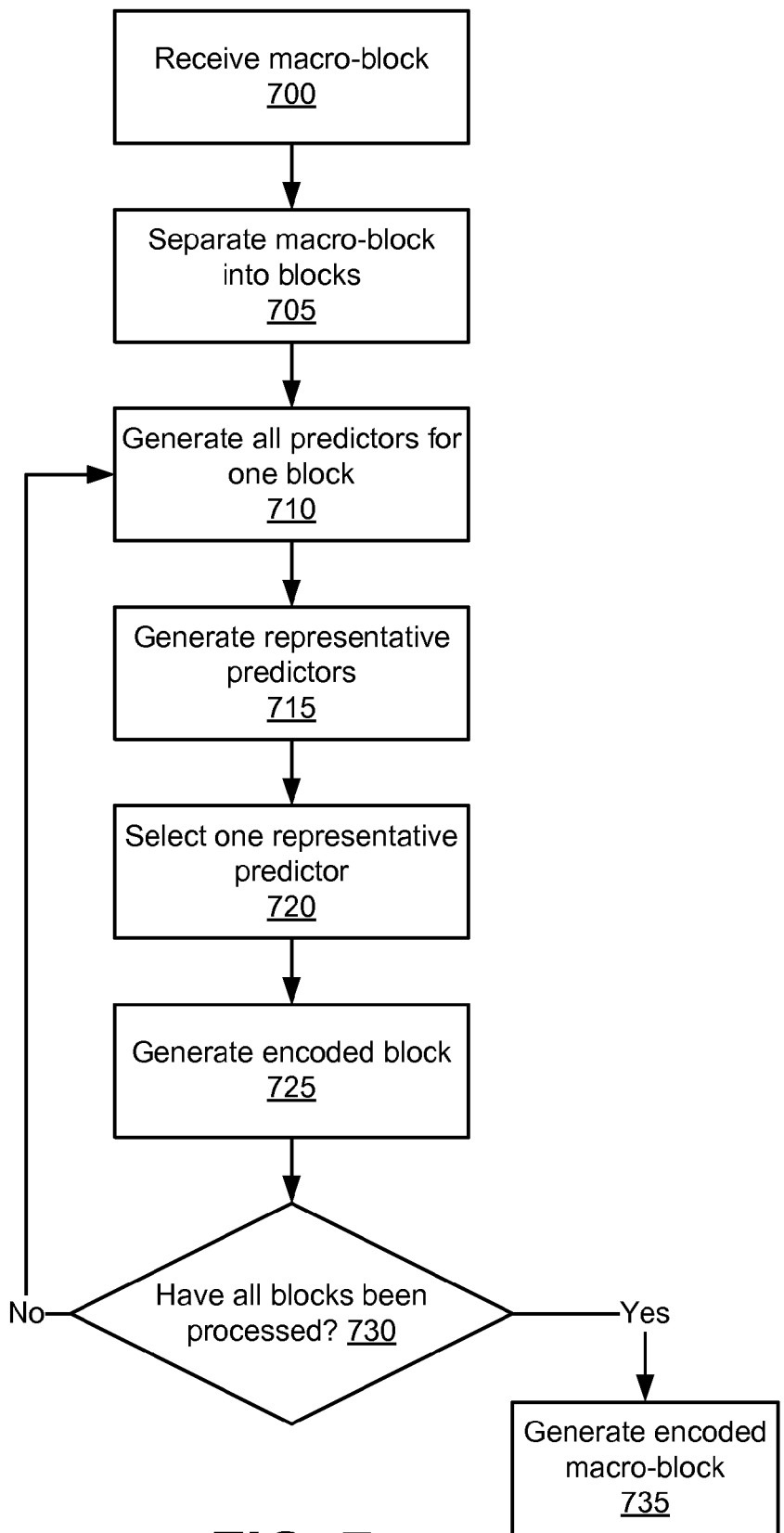
FIG. 7 is a flow chart illustrating a process for encoding a macro-block, according to one embodiment.
Figure 8:
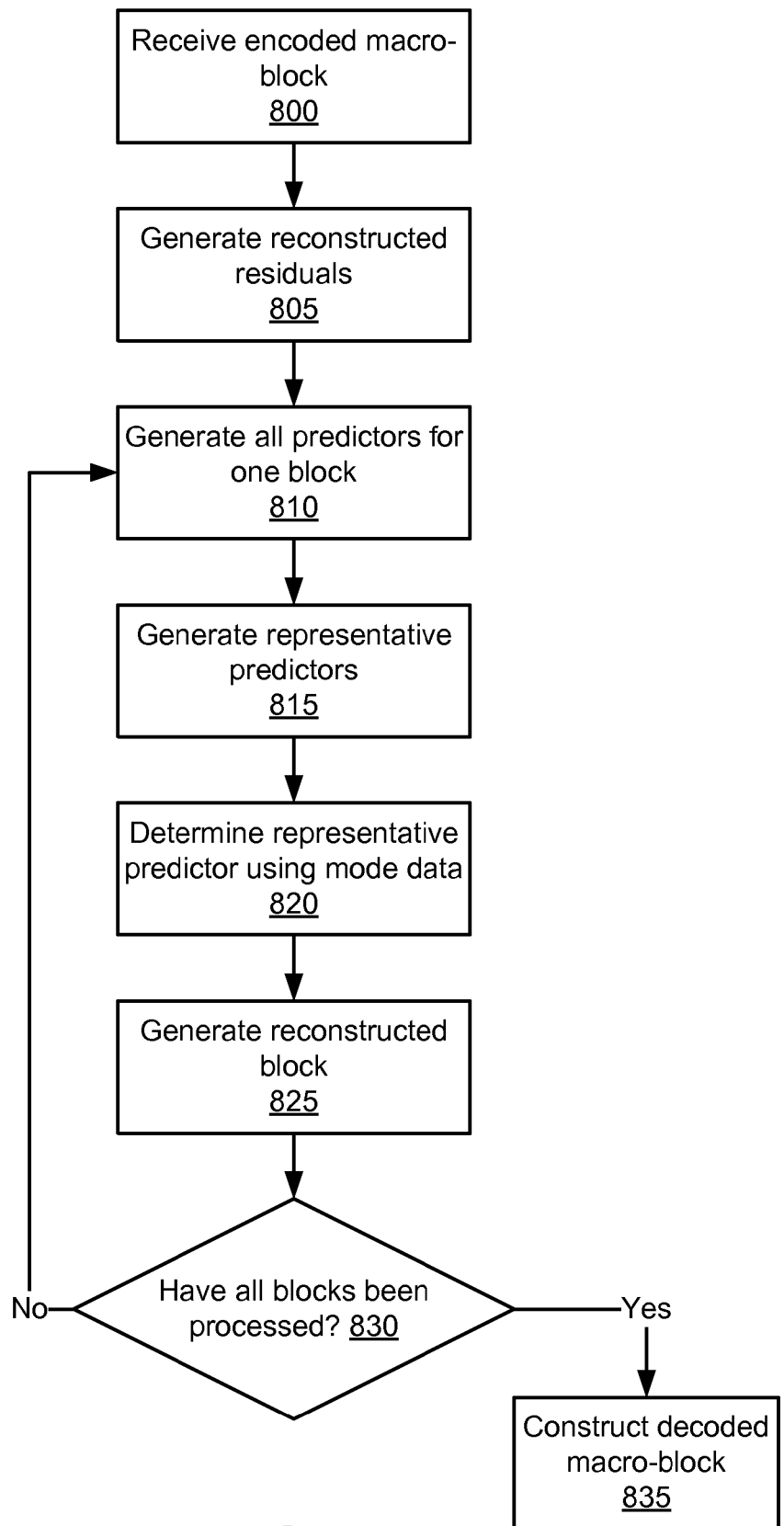
FIG. 8 is a flow chart illustrating a process for decoding a macro-block, according to one embodiment.
Figure 9:
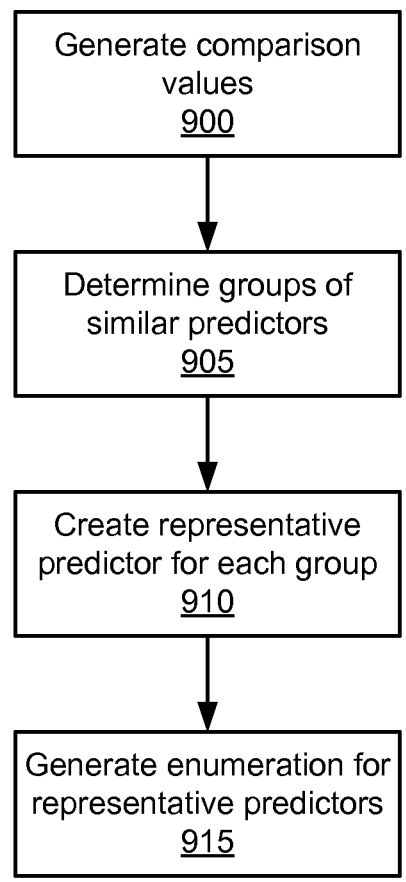
FIG. 9 is a flow chart illustrating a process for reducing a set of spatial predictors down to a set of representative spatial predictors, according to one embodiment.

FIGS. 7 through 9 are flow charts illustrating a method of encoding and decoding a video using the spatial predictor reduction process. FIG. 7 is a flow chart illustrating a process for encoding a macro-block using the spatial predictor reduction process, according to one embodiment. The process begins when the block separation module 302 in the spatial prediction module 300 receives 700 a macro-block as part of a raw image frame. The block separation module 302 separates the raw frame into macro-blocks, and then separates 405 the macro-blocks into blocks. In one embodiment, the macro-block is separated into a 4×4 grid of blocks, which yields a total of sixteen blocks for each macro-block.

After the macro-block is separated 705 into blocks, the predictor generation module 310 generates 710 a full set of spatial predictors for a block using one or more pixels in the frame. In one embodiment, there are a total of nine spatial prediction modes, so the predictor generation module generates nine spatial predictors, although a different number of prediction modes may be used. In some embodiments, the prediction modes use the pixels adjacent to the top and left edge of the block, but any set of pixels in the same frame may be used to generate the predictors.

The predictor reduction module 314 uses the full set of predictors to generate 715 a set of representative predictors, where each representative predictor represents a group of similar predictors in the full set of predictors. Predictors within the full set of predictors are likely to be similar to each other for blocks that depict uniform areas of a frame, such as dark shadows or cloudless skies. In these cases, the set of representative predictors contains fewer predictors than the full set of predictors.

Next, the predictor decision module 318 compares each representative predictor to the original block and selects 720 the representative predictor that is the closest match. The predictor decision module 318 may perform the comparisons by calculating the sum of absolute differences (SAD) metric between the original block and each representative predictor, or it may use some other method to quantify the difference between the representative predictors and the block.

After a representative predictor is selected 720, the residual generation module 322, the transform module 206, and the quantization module 214 work together to generate 725 the encoded block. To encode the block, the residual generation module 322 subtracts the selected predictor from the original block to generate a residual describing the difference between the block and the predictor. Then the transform module 206 uses a mathematical transformation (e.g., DCT transformation) to decompose the residual into a series of transform coefficients, and the quantization module 214 quantizes the transform coefficients to reduce the number of bits needed to represent the coefficients in the bit stream.

When the block encoding process 725 is complete, the encoding module 112 checks 730 to determine whether every block in the macro-block has been processed. If some of the blocks have not yet been processed, then the encoding module starts processing the next block in the macro-block by generating 710 a full set of predictors for the next block. If every block in the macro-block has been processed, then the lossless encoding module 218 generates 735 the encoded macro-block by assembling and compressing the header information 422, the mode information 424, and the quantized transform coefficients for each block 426 into the bit stream 420 shown in FIG. 4B. The result is an encoded macro-block that may be stored or transmitted with fewer bits than the raw, unencoded macro-block but still contains enough information for the decoding module 114 to reconstruct the macro-block and display the macro-block to a user.

In other embodiments, some of the steps shown in FIG. 7 may be omitted, performed in a different sequence, or performed in parallel. For example, the step of separating 705 the macro-block into blocks may be omitted and the subsequent steps 710, 715, 720 may be performed at the macro-block level. In this case, the steps of generating 725 the encoded block and determining 730 whether all block have been processed are rendered moot, so the encoding module 112 generates 735 the encoded macro-block after selecting 720 a representative predictor. In addition, the process of generating 715 representative predictors may be performed before all predictors for one block are generated 710. As described with reference to FIG. 9, the first step in the process of generating 715 representative predictors is to generate 900 difference metrics between each pair of predictors, and this step 900 may begin as long as two predictors or more have been generated.

FIG. 8 is a flow chart illustrating a process for reconstructing a macro-block that was encoded with the spatial predictor reduction process, according to one embodiment. The process starts when the lossless decoding module 502 in the decoding module 114 receives 800 an encoded bit stream containing one or more macro-blocks that were encoded with the spatial prediction reduction process. After the macro-blocks are received 800, the lossless decoding module 502, inverse quantization module 506, and inverse transform module 510 use the quantized transform coefficients in the bit stream to reconstruct 805 the residual for each block in the macro-block.

For each block, the predictor generation module 602 uses edge pixels from other blocks in the frame to generate 810 a plurality of spatial predictors using a plurality of spatial prediction modes. The number of prediction modes is typically defined in a video codec. For example, the H.264 standard contains nine predefined prediction modes, although other embodiments may include fewer, different, or additional prediction modes.

The predictors that were generated 810 in the predictor generation module 602 are passed on to the predictor reduction module 606, which uses a similarity threshold to generate 815 a set of representative predictors. To ensure that the same set of representative predictors is created in the encoding module 112 and the decoding module 114, the process used to generate 815 representative predictors during the decoding process is identical to the process used to generate 715 representative predictors during the encoding process.

After the predictor reduction module 606 generates 815 the set of representative predictors, the predictor decoding module 610 uses the mode data in the bit stream to determine 820 which representative predictor was chosen to generate the residual for the block during the encoding process. As shown in FIG. 4C, the mode data 424 is defined relative to the prediction mode that was used for the previous block and contains between zero and four bits for an embodiment where nine prediction modes were used to generate 810 nine different predictors.

Next, the block generation module 614 adds the chosen representative predictor to the reconstructed residual to generate 825 the reconstructed block. After the block has been reconstructed, the decoding module 114 checks to determine 830 whether every block in the macro-block has been processed. If one or more blocks are still to be processed, then the predictor generation module 602 generates 810 the plurality of spatial predictors for the next block. If every block in the macro-block has been processed, then the spatial/temporal reconstruction module 514 constructs

835 the decoded macro-block by mapping each block to its position within the macro-block and mapping the macro-block to its position within the video frame.

In other embodiments, some of the steps shown in FIG. 8 may be omitted, performed in parallel, or performed in a different order. For example, if the steps 710, 715, 720 surrounding the generation of the representative predictors were performed on the macro-block level instead of on the block level during the encoding process, then it is not necessary to determine 830 whether all blocks have been processed. In this case, the decoded macro-block can be constructed 835 after the decoding module 114 generates 325 the reconstructed macro-block by adding the residual to the predictor. Again, the process of generating 815 representative predictors may be performed before all predictors for one block are generated 810 because the step of generating 900 difference metrics may begin as soon as two predictors are available. The decoding module 114 may also analyze the mode data to determine 820 which representative predictor was used before generating 815 the relative predictors. By analyzing the mode data first, the decoding module 114 may reduce its processing use by only generating the representative predictor that was used.

FIG. 9 is a flow chart illustrating the spatial predictor reduction process in detail, according to one embodiment. The process shown in FIG. 9 occurs in the predictor reduction module 314 of the spatial prediction module 300 and in the predictor reduction module 606 of the spatial reconstruction module 600. After the predictor reduction module 314, 606 receives the plurality of spatial predictors from the predictor generation module 310, 602, the predictor reduction module generates 900 a difference metric between each pair of spatial predictors. In one embodiment, the difference metric is the sum of absolute differences (SAD) metric, but any method of comparing two predictors may be used. For example, the difference metrics may be generated by comparing the average luminance or chrominance values of the two predictors.

After generating 900 the difference metrics, the predictor reduction module 314, 606 analyzes the difference metrics to organize 905 the predictors into groups of similar predictors. The predictor reduction module 314, 606 uses a similarity threshold to determine whether any two predictors are similar. If the difference metric between the two predictors falls below the similarity threshold, then the two predictors are considered similar and the predictor reduction module 314, 606 places the predictors in the same group. If the difference metric between a third predictor and one of the predictors in the group also falls below the similarity threshold, then the predictor reduction module 314, 606 also adds the third predictor to the group. Meanwhile, if a predictor is not similar to any other predictor (i.e., if the difference metric between the predictor and every other predictor is above the similarity threshold), then the predictor reduction module 314, 606 places the predictor in its own group.

For each group of similar predictors, the predictor reduction module 314, 606 creates 910 a representative predictor that represents the predictors in the group. In one embodiment, the predictor reduction module 314, 606 may create each representative predictor by copying one of the predictors in the group (e.g., the predictor with the lowest index). The predictor reduction module may also use some other method of creating the representative predictor, such as taking an average of one or more of the predictors in the group.

After the predictor reduction module 314, 606 creates 910 a representative predictor for each group of similar predictors, the predictor reduction module enumerates 915 each representative predictor. The same method of enumeration is used during the encoding and decoding processes to ensure that the mode data in the bit stream is decoded correctly. As a result, the enumeration process 915 does not use data that cannot be reproduced in the decoding process. For example, the enumeration method described in conjunction with FIG. 4A is based on the indices of the predictors in each group, and these indices can be reproduced during the decoding process by generating the predictors in the same order as during the encoding process. In other embodiments, other enumeration methods may be used as long as the method is based on data that is available during both the encoding and decoding processes.

In alternative embodiments, some of the steps shown in FIG. 9 may be performed in parallel. For instance, the predictor reduction module 314, 606 may begin comparing the difference metrics to the similarity threshold to determine 905 groups of similar predictors once the first difference metric has been generated 900, and the step of generating 900 the rest of the difference metrics may be performed in parallel with using the difference metrics to determine 905 groups of similar predictors. The predictor reduction module 314, 606 may also begin creating 910 a representative predictor for each group of similar predictors once the first group of similar predictors has been determined. There is no need to wait for each predictor to be placed into a 910 group before creating the representative predictors.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described with reference to FIGS. 1-3 and FIGS. 5-6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for reducing the number of spatial predictors used in a video compression process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for encoding an image frame, the method comprising:
generating a first set of predictors for an image block of an image frame comprising a plurality of image blocks, each predictor generated with a different spatial prediction mode;
determining difference metrics between the first set of predictors;
generating a second set of predictors having a fewer number of predictors than the first set of predictors by replacing two or more predictors in the first set of predictors with a replacing predictor responsive to difference metrics between the two or more predictors in the first set falling below a similarity threshold, each of chrominance or luminance values of pixels in the replacing predictor being an average of chrominance or luminance values of corresponding pixels in the two or more predictors of the first set of predictors;

comparing each predictor in the second set with the image block to determine a difference in content between each predictor in the second set and the image block;

selecting one predictor of the second set of predictors with a lowest difference in content relative to the image block; and encoding the image block based on the selected predictor, wherein encoding the image block based on the selected predictor comprises generating mode information identifying the selected predictor, the mode information having a different bit length based at least on a number of the second set of predictors.

2. The method of claim 1, wherein the difference metrics are the Sum of Absolute Differences metrics.

3. The method of claim 1, wherein the single predictor is one of the two or more predictors of the first set of the predictors.

4. The method of claim 1, wherein the mode information comprises a first bit indicating whether the selected predictor is identical to a previous selected predictor responsive to the second set of predictors containing a plurality of predictors.

5. The method of claim 4, wherein the first bit is omitted responsive to the second set of predictors consisting of one predictor.

6. The method of claim 4, wherein the mode information further comprises one or more additional bits identifying the selected predictor responsive to the first bit indicating that the selected predictor is not identical to the previous selected predictor.

7. The method of claim 4, further comprising:
responsive to encoding the image block, creating a bit stream comprising:
a first item of mode information, the first item of mode information identifying the predictor mode for a first encoded image block;
the first encoded image block following the first item of mode information;
a second item of mode information following the first encoded image block, the second item of mode information identifying the predictor mode for a second encoded image block; and
the second encoded image block following the second item of mode information.

8. The method of claim 4, wherein encoding the image block based on the selected predictor comprises:
calculating a residual representing the difference between the image block and the selected predictor, the residual calculated by performing a subtraction operation between the image block and the selected predictor;
performing a discrete cosine transform on the residual, the discrete cosine transform decomposing the residual into a plurality of transform coefficients; and
quantizing the plurality of transform coefficients, the quantization generating a plurality of quantized transform coefficients.

9. The method of claim 4, wherein the similarity threshold is dynamically changed.

10. The method of claim 9, wherein the similarity threshold is changed based on a rate-distortion slope.

11. A system for encoding an image frame comprising:
a predictor generation component comprising a processor and memory coupled to the processor, the memory storing instructions causing the processor to generate a first set of predictors for an image block of an image frame comprising a plurality of image blocks, each predictor generated with a different spatial prediction mode;

a predictor reduction component comprising the processor and the memory, the memory further storing instructions causing the processor to generate a second set of predictors having a fewer number of predictors than the first set of predictors by replacing two or more predictors in the first set of predictors with a replacing predictor responsive to difference metrics between the two or more predictors in the first set falling below a similarity threshold, each of chrominance or luminance values of pixels in the replacing predictor being an average of chrominance or luminance values of corresponding pixels in the two or more predictors of the first set of predictors;

a predictor decision component comprising the processor and the memory, the memory further storing instructions causing the processor to:
compare each predictors in the second set with the image block to determine difference in content between each predictor in the second set and the image block;
select one predictor of the second set of predictors with a lowest difference in content relative to the image block; and
an encoder component configured to encode the image block based on the selected predictor, the encoder configured to generate mode information identifying the selected predictor, the mode information having a different bit length based at least on a number of the second set of predictors.

12. The system of claim 11, wherein the mode information comprises a first bit indicating whether the selected predictor is identical to a previous selected predictor responsive to the second set of predictors containing a plurality of predictors.

13. The system of claim 12, wherein the encoder component is further configured to omit the first bit responsive to the second set of predictors consisting of one predictor.

14. The system of claim 12, wherein the mode information further comprises one or more additional bits identifying the selected predictor responsive to the first bit indicating that the selected predictor is not identical to the previous selected predictor.

15. The system of claim 12, wherein the encoder component is further configured to:
responsive to encoding the image block, create a bit stream comprising:
a first item of mode information, the first item of mode information identifying the predictor mode for a first encoded image block;
the first encoded image block following the first item of mode information;
a second item of mode information following the first encoded image block, the second item of mode information identifying the predictor mode for a second encoded image block; and
the second encoded image block following the second item of mode information.

16. The system of claim 11, wherein the encoder component comprises:
a residual generation module configured to calculate a residual representing the difference between the image block and the selected predictor, the residual calculated by performing a subtraction operation between the image block and the selected predictor;
a transform module configured to perform a discrete cosine transform on the residual, the discrete cosine transform decomposing the residual into a plurality of transform coefficients; and a quantization module configured to quantize the plurality of transform coefficients, the quantization generating a plurality of quantized transform coefficients.

17. The system of claim 11, wherein the similarity threshold is dynamically changed.

18. The system of claim 17, wherein the similarity threshold is changed based on a rate-distortion slope.

19. A non-transitory computer readable medium configured to store instructions, the instructions when executed by a processor cause the processor to:

generate a first set of predictors for an image block of an image frame comprising a plurality of image blocks, each predictor generated with a different spatial prediction mode;

generate a second set of predictors having a fewer number of predictors than the first set of predictors by replacing two or more predictors in the first set of predictors with a replacing predictor responsive to difference metrics between the two or more predictors in the first set falling below a similarity threshold, each of chrominance or luminance values of pixels in the replacing predictor being an average of chrominance or luminance values of corresponding pixels in the two or more predictors of the first set of predictors;

compare each predictor in the second set with the image block to determine a difference in content between each predictor in the second set and the image block;

select one predictor of the second set of predictors with a lowest difference in content relative to the image block; and encode the image block based on the selected predictor to generate mode information identifying the selected predictor, the mode information having a different bit length based at least on a number of the second set of predictors.

20. The computer readable storage medium of claim 19, wherein encoding the image block based on the selected predictor comprises:

calculating a residual representing the difference between the image block and the selected predictor, the residual calculated by performing a subtraction operation between the image block and the selected predictor;

performing a discrete cosine transform on the residual, the discrete cosine transform decomposing the residual into a plurality of transform coefficients; and quantizing the plurality of transform coefficients, the quantization generating a plurality of quantized transform coefficients.

21. The computer readable storage medium of claim 19, wherein the similarity threshold is dynamically changed.

22. The computer readable storage medium of claim 21, wherein the similarity threshold is changed based on a rate-distortion slope.

* * * * *

UNITED STATES PATENT AND TRADEMARK OFFICE
CERTIFICATE OF CORRECTION

PATENT NO. : 9,787,985 B2
APPLICATION NO. : 13/536793
DATED : October 10, 2017
INVENTOR(S) : Mikhail Korman and Sergey Fedorov It is certified that error appears in the above-identified patent and that said Letters Patent is hereby corrected as shown below:

In the Claims

Claim 8, Line 44: replace "of claim 4" with -- of claim 1 --.
Claim 9, Line 56: replace "of claim 4" with -- of claim 1 --.
Claim 11, Line 17: replace "each predictors" with -- each predictor --.

Signed and Sealed this
Twenty-seventh Day of February, 2018

Andrei Iancu
*Director of the United States Patent and Trademark Office*